United States Patent [19]

Satyanarayana et al.

[11] Patent Number: 5,909,429
[45] Date of Patent: Jun. 1, 1999

[54] METHOD FOR INSTALLING A WIRELESS NETWORK WHICH TRANSMITS NODE ADDRESSES DIRECTLY FROM A WIRELESS INSTALLATION DEVICE TO THE NODES WITHOUT USING THE WIRELESS NETWORK

[75] Inventors: Srinagesh Satyanarayana, Tarrytown; Frank C. Guida, Fishkill; George A. Melnik, Montrose, all of N.Y.

[73] Assignee: Philips Electronics North America Corporation, New York, N.Y.

[21] Appl. No.: 08/707,274

[22] Filed: Sep. 3, 1996

[51] Int. Cl.[6] .......................... H04L 12/28; H04L 12/403; H04L 12/42; H04J 3/24
[52] U.S. Cl. ........................... 370/254; 370/475; 370/453
[58] Field of Search .................................... 370/254, 475, 370/453, 389, 401, 338

[56] References Cited

U.S. PATENT DOCUMENTS

| | | | |
|---|---|---|---|
| 5,675,571 | 10/1997 | Wilson | 370/85.1 |
| 5,737,318 | 4/1998 | Melnik | 370/254 |
| 5,740,160 | 4/1998 | Ikegami et al. | 370/255 |
| 5,768,277 | 6/1998 | Ohno et al. | 370/457 |

*Primary Examiner*—Douglas W. Olms
*Assistant Examiner*—David R. Vincent
*Attorney, Agent, or Firm*—Edward Blocker; Bernard Franzblau

[57] ABSTRACT

A method for installing a wireless network, which includes the steps of physically installing a plurality of nodes in respective different locations in a building, connecting the nodes to a power supply and powering up the nodes, using a wireless installation device to program a respective address into the nodes, using the wireless installation device to program one or more default settings into the nodes, using the wireless installation device to verify operation of the nodes, and, using the wireless installation device to dump at least information regarding the physical location and associated address of the nodes to a building computer. In a presently preferred embodiment, the wireless installation device is preferably an RF portable computer which has an RF transmitter which has a variable power setting, and an RF receiver which also has a variable power setting. During installation of each node, the RF portable computer assigns a unique address to that node, and then loads the assigned address and all appropriate default settings into that node. The address data and default settings are preferably stored in nonvolatile memory provided in each node. The wireless programming of the nodes is preferably accomplished using a software "handshaking" procedure which ensures that the address and default setting data is only loaded into the node currently being programmed, and not inadvertently into one or more other nearby nodes. In this connection, an iterative power reduction scheme can be utilized to prevent multiple nodes from being inadvertently assigned the same address. Also disclosed is a method for installing one or more nodes in an existing wireless network, which method is performed in essentially the same manner as that described above in connection with the original installation of the wireless network itself, with the exception being that instead of an entire network of nodes being installed, only one or more nodes are installed in a pre-existing wireless network.

23 Claims, 3 Drawing Sheets

METHOD FOR INSTALLING A WIRELESS NETWORK WHICH TRANSMITS NODE ADDRESSES DIRECTLY FROM A WIRELESS INSTALLATION DEVICE TO THE NODES WITHOUT USING THE WIRELESS NETWORK

BACKGROUND OF THE INVENTION

The present invention relates generally to wireless, packet-hopping networks, and more particularly, to a method for installing a wireless, packet-hopping network.

A network which consists of a plurality of nodes which communicate with each other and with a control node (also referred to as "main" or "central" node) via wireless (RF) links is generally referred to as a wireless (or radio) network. In wireless, packet-hopping networks, each node includes a node controller which includes a digital signal processing device (e.g., a microprocessor) and an RF transceiver. Data is communicated (transferred) between the individual nodes and the control node by a technique known as "packet hopping", in which individual "packets" of data are transferred from the control node to a destination node and from an origin node to the control node by being hopped from node-to-node in accordance with a network routing protocol.

"Packets" are logical units of data typically ranging in size from about 5–1000 bytes. Generally, these packet-hopping data communications are carried out under the control of the control node, which is typically a computer on which resides the data communications control software. The packet-hopping data transfer scheme enables a reduction in the cost of the RF transceivers and compliance with FCC Part 15 requirements.

Such wireless, packet-hopping networks are particularly suitable for controlling one or more functions or systems of a building, e.g., the lighting, HVAC, and/or security systems of the building, because a wireless network offers a low-cost, indoor communication infrastructure that does not require new lines to be added to the existing structure in order to carry the network information. Further, such networks can support additional systems installed in the building, such as paging, heating control, air conditioning control, and personal communications systems.

The control node of such building control networks is typically a programmable controller or building computer. The individual nodes and the building computer run different software programs which are complementary, and which together constitute the system control software. The individual nodes are typically distributed throughout the building to monitor the status/value of prescribed parameters of the building system being controlled, and to produce control signals in response to commands issued by the building computer to adjust the prescribed parameters as required. It is important that the building computer be able to send and receive data to and from each node in the network in order to properly monitor the status/value of the prescribed parameters, and to issue commands to adjust the prescribed parameters as required, in accordance with the system control software.

An exemplary building control network is an automatic or intelligent lighting control system which monitors lighting levels, occupancy status, energy consumption as a function of time, and/or other lighting parameters of each room and/or area of the building within the network, i.e., each room and/or area of the building which is equipped with a lighting module(s) linked to a node controller (also referred to as a "wall unit") which includes an RF transceiver, a digital signal processing device (e.g., microcontroller or microprocessor), and control circuitry to signal the lights to change brightness levels. Each lighting module and its associated node controller together constitute a node in the network which is under the control/management of the building computer.

In such an intelligent lighting control system, each of the lighting modules is preferably individually programmable (e.g., by building occupants), via its associated wall unit, to provide direct control of the setting of the dimming ballast thereof, and thus, direct control of the lighting level of the lamp(s) thereof. In this regard, each of the nodes includes one or more sensors (e.g., occupancy status, daylight (ambient lighting), and dimming/lighting level sensors) which provide sensor feedback data to the digital signal processing device (e.g., a microprocessor) of the node controller, which is programmed to analyze (process) the sensor feedback data and to generate control signals for adjusting the lighting level of the monitored lamp(s) associated therewith, as required, to achieve the programmed local lighting conditions.

The sensor feedback data is also transmitted by each node in the network to the building computer, when requested by the building computer to do so, or when the local lighting conditions change. The building computer analyzes (processes) the sensor feedback data in accordance with lighting system control software loaded therein, and sends control data (commands) to the individual nodes, as required, in order to adjust the lighting levels of the monitored rooms/areas of the building in accordance with the lighting system control software, e.g., to optimize the energy efficiency of the lighting system, and thereby override the programmed lighting levels provided by the individual lighting modules. Thus, in addition to being individually programmable and being capable of independent operation, the distributed modules are functionally integrated into a single building-wide network under the control of the building computer.

Data communications in such networks are generally between the building computer and the individual nodes, and vice versa, over a common communications channel, in accordance with a network routing protocol. The data is transferred in packets from the building computer to a destination node outside of the immediate transmitting range of the building computer (i.e., not directly "linked" or "connected" to the building computer) by hopping or relaying each packet from node-to-node until the packet reaches the destination node. Each of the nodes which hops or relays a packet to one or more other nodes in the network is commonly referred to as a "repeater node", or simply, "repeater". The destination node generally acknowledges receipt of a data packet from the building computer by returning an acknowledgement data packet to the building computer via one or more repeaters in a similar fashion.

Advantageous network routing algorithms are disclosed in co-pending U.S. patent application Ser. No. 08/558,447, filed Nov. 16, 1995, in the name of A. Dasgupta, which is assigned to the assignee of the present invention, and co-pending U.S. patent application Ser. No. 08/608,910, filed Feb. 29, 1996, in the name of George A. Melnik, which is also assigned to the assignee of the present invention. The disclosures of both of these applications are herein incorporated by reference.

The installation of a building control network entails the physical placement and powering-up of each node in the network. Prior to the advent of the present invention, the address of each node in the network and the default parameters for each node were preprogrammed at the time of manufacture (i.e., "factory-set"), and not set at the time of installation. However, the preprogramming of nodes at the time of manufacture (i.e., prior to installation in a particular building), necessitates that long addresses (e.g., 100 bits or more) be used to ensure that all manufactured nodes are provided with a unique address. Such long addresses reduce the efficiency of data communications over the common network communications channel.

In this connection, since a typical network only has a few hundred nodes, it is only necessary to employ addresses which are 7–10 bits long in order to ensure that each node in the network is assigned a unique address (as long as no other nearby building with a similar system is within the transmitting range of the network, in which case, a building identifier code can be added to the address of each node, or the networks in the different buildings can be operated on different channels). Clearly, the use of shorter node addresses would significantly enhance the data communications efficiency of the wireless network. Thus, site specific addressing of the nodes at the time of installation would be superior to the technique of preprogramming the node addresses. As will become apparent hereinafter, the present invention, in one of its aspects, provides this capability.

Prior to the advent of the present invention, the preprogrammed default settings of the individual nodes in the wireless network could only be changed via commands issued by the building computer. This significantly limits the flexibility and significantly increases the cost of installation of the wireless network. Thus, the capability of directly programming each of the nodes at the time of installation would enhance the flexibility and decrease the cost of installation of the wireless network. As will become apparent hereinafter, the present invention, in another of its aspects, also provides this capability.

To complete the installation, the installer must determine the address of each node in the network, and then input into the building computer, for each node in the network, the address of that node and location identification data (e.g., room number) indicative of the physical location of that node within the building. At present, the complexity of this procedure increases the required time and cost for installation of the network. As will become apparent hereinafter, the present invention, in another of its aspects, simplifies this procedure, and reduces the required time and cost for this procedure.

After the nodes and building computer are installed, the wireless network is then initialized, in order to provide the building computer with nodal connectivity information which the network communications protocol requires in order to route packets of data through the network by the above-described packet-hopping technique. The nodal connectivity information includes information as to which nodes in the network are able to communicate with each other. The building computer formulates routing tables on the basis of the nodal connectivity information which it gathers during the network initialization process. The building computer then uses these routing tables to transfer packets of data from the building computer to a destination node and from an origin node to the building computer by hopping the packets from node-to-node along a route which it determines from the routing tables to be the most efficient route available at that time.

An advantageous automatic initialization scheme is disclosed in co-pending U.S. patent application Ser. No. 08/579,650, filed on Dec. 27, 1995, in the name of George A. Melnik, and assigned to the assignee of the present invention, the disclosure of which is herein incorporated by reference.

As feedback to the user (typically the building operations personnel), the physical configuration of the wireless network can be displayed on the monitor of the building computer, e.g., by illustrating the physical location of each node on a floor plan of the building. In this connection, the links between the nodes of the network can be automatically drawn during the initialization routine, to thereby provide a graphical representation of the wireless network for diagnostic and operational purposes.

Prior to the advent of the present invention, the operation of each of the individual nodes could only be verified during (or after) network initialization. Consequently, any malfunction or improper operation of a given node could only be detected or diagnosed after the entire network was installed and tested.

Clearly, it would be advantageous to have the capability of testing or verifying the operation of the nodes at the time that they are installed, to thereby facilitate correction of any diagnosed error or replacement of the node before completion of the installation of the entire network, and prior to execution of the initialization routine. Such a capability would reduce the required time and cost for network initialization, and would minimize network communications difficulties. As will also become apparent hereinafter, the present invention, in another of its aspects, also provides this capability.

SUMMARY OF THE INVENTION

The present invention encompasses a method for installing a wireless network, which includes the steps of physically placing a plurality of nodes in respective different locations in a building, using a wireless installation device to program at least selected ones of the nodes with a respective address, and providing information regarding the physical location and associated address of the at least selected ones of the nodes to a control node. The method preferably further includes the step of using the wireless installation device to program the at least selected ones of the nodes with one or more default parameters ("default settings").

The method preferably also includes the step of using the wireless installation device to verify proper operation of each of the nodes. The method also preferably includes the steps of connecting the nodes to a power supply and powering up the nodes, prior to using the wireless installation device to program the nodes.

Each of the nodes preferably includes a wireless RF transceiver and a digital signal processing device coupled to the RF transceiver. The wireless RF transceiver and digital signal processing device (e.g., a microprocessor or microcontroller) together constitute a "node controller".

The wireless network is preferably a wireless, packet-hopping network which is configured to control one or more functions or systems of the building in which the network is installed, e.g., the lighting, HVAC, and/or security systems of the building. In a presently preferred embodiment of the present invention, the wireless network is an automatic or intelligent lighting control system for the building, and each of the nodes further includes a lighting module(s) coupled to the node controller. Each lighting module suitably includes a dimming ballast and a lamp(s) driven thereby.

In a presently preferred embodiment of the present invention, the wireless installation device is a portable computer which is equipped with wireless communications facilities. In this connection, the portable computer is preferably an RF portable computer which has an RF transmitter which has a variable power setting, and an RF receiver which also has a variable threshold. During installation of each node, the RF portable computer assigns a unique address to that node, and then loads the assigned address and all appropriate default settings into that node. The address data and default settings are preferably stored in nonvolatile memory provided in each node.

In accordance with another aspect of the present invention, the step of using the wireless installation device is carried out using a "handshaking" procedure which ensures that the address and default setting data is only loaded into the node currently being programmed, and not inadvertently into one or more other nearby nodes. In this connection, an iterative power reduction scheme can be utilized to prevent multiple nodes from being inadvertently assigned the same address.

The present invention also encompasses a method for installing one or more nodes in an existing wireless network, which method is performed in essentially the same manner as that described above in connection with the installation of the wireless network itself, with the exception being that instead of an entire network of nodes being installed, only one or more nodes are installed in a pre-existing wireless network. This process of installing one or more nodes in an existing wireless network is sometimes referred to as "incremental installation". Such a process may be utilized when one or more "new" nodes are added to an existing wireless network, or when one or more nodes are inadvertently "omitted" from the wireless network during the original initialization procedure.

BRIEF DESCRIPTION OF THE DRAWINGS

These and various other features and advantages of the present invention will be readily understood with reference to the following detailed description of the invention taken in conjunction with the accompanying drawings, in which.

DETAILED DESCRIPTION OF THE INVENTION

Figure 1:
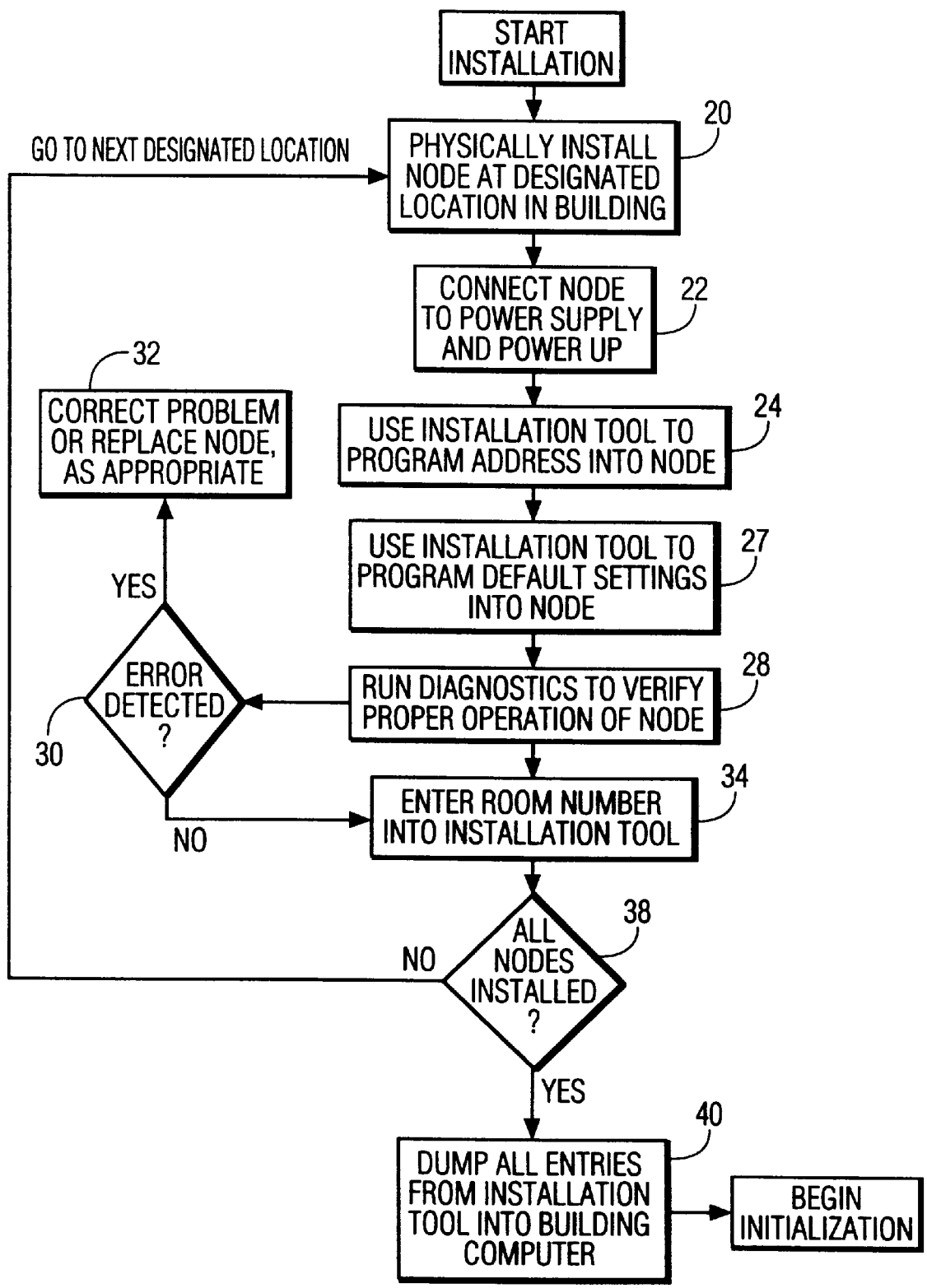
FIG. 1 is a flow chart illustrating a method for installing a wireless network in accordance with a presently preferred embodiment of the present invention.

With reference now to FIG. 1, a method for installing a wireless network in accordance with a presently preferred embodiment of the present invention will now be described. The first step 20 in the installation process is to physically place and install a node to be included in the network at a designated location in the building in which the network is to be installed.

The next step 22 is to connect the node to a power supply and to then power up the node.

The next step 24 is to use a wireless installation tool or device 26 (shown in FIG. 3) to assign a unique address to the node and to load the assigned address into a memory (preferably nonvolatile memory) in the node.

The next step 27 is to use the wireless installation tool 26 to program default parameters (e.g., lighting schedule, minimum and maximum brightness levels, etc.) into the node. These default parameters or settings are preferably loaded into the node's memory.

The next step 28 is to use the wireless installation tool 26 to run a diagnostics routine in order to verify proper operation of the node. If an error in the operation of the node is detected at decision point 30, then the method branches to step 32, in which the problem causing the error is corrected or the node is replaced, as appropriate, in accordance with a prescribed troubleshooting procedure. If no error is detected at decision point 30, then the method branches to step 34, in which data indicative of the physical location of the node (e.g., a room number assigned to the room in which the first node is physically placed) is entered into the wireless installation tool 26. It will be appreciated by those skilled in the pertinent art that step 34 can be executed prior to execution of step 28, or even prior to execution of step 24, rather than after the decision point 30. In general, as will become more apparent hereinafter, the order of execution of the steps of the method of the present invention is not limiting thereto.

At decision point 38, a determination is made as to whether or not all nodes to be included in the network have been installed. If it is determined at decision point 38 that all nodes have not yet been installed, then the installer goes to the next designated location in the building where the next node to be installed is to be physically located, and the method loops back to step 20. The above-described procedure (i.e., steps 20, 22, 24, 28, 30/32, 30/34) is repeated for each node to be installed, until all nodes to be included in the network have been installed.

Figure 2:
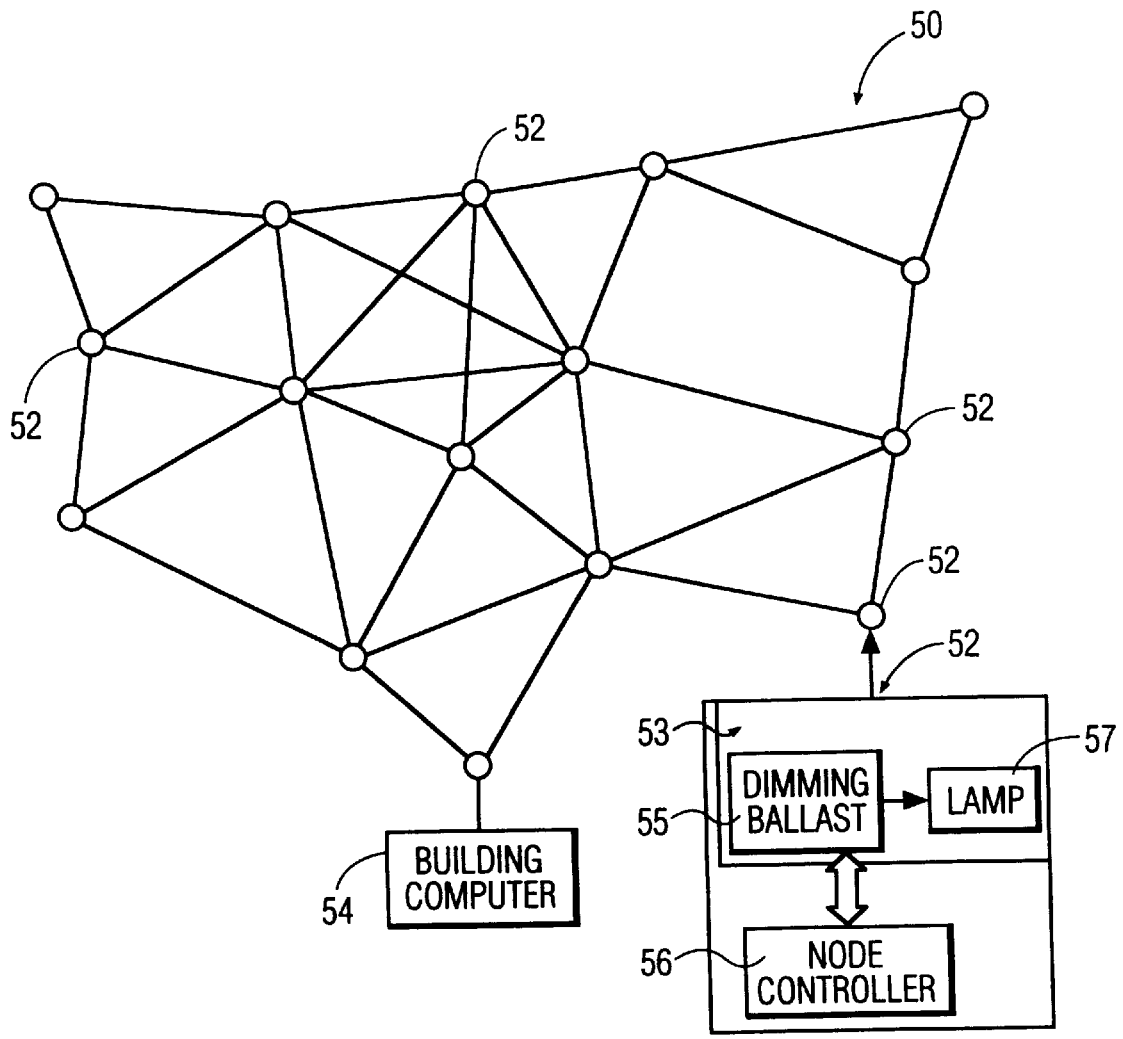
FIG. 2 is a block diagram of a wireless, packet-hopping network which can be installed using the method of the present invention; and, FIG. 3 is a block diagram depicting a wireless communications link between a wireless installation tool and a node controller.

After all nodes have been physically installed, the method branches from decision point 38 to step 40, in which all entries stored (preferably in tabular form) in the wireless installation tool 26 (i.e., all node address and default setting data) is dumped (downloaded) into a control node 54 (see FIG. 2). The control node 54 is preferably the building computer. The location of each of the nodes in the network can be depicted on a floor plan for the building and displayed on the building computer monitor.

Although the network installation method of the present invention has been described above in terms of physically placing, installing, and programming the individual nodes in the network one-at-a-time, in a sequential fashion, it will be readily appreciated by those skilled in the pertinent art that all of the individual nodes can be physically placed and installed before programming any of the nodes. In this connection, the order of execution of the various steps of the above-described network installation method of the present invention is not limiting to the present invention. However, by installing only one node at a time, it can be ensured that two or more nodes will not be simultaneously programmed, since nodes which are already installed will not respond to the commands issued by the installation tool 26.

Thus, in a broad sense, the present invention encompasses a method for installing a wireless network, which includes the steps of physically installing a plurality of nodes in respective different locations in a building, using a wireless installation tool to program at least selected ones of the nodes with a respective address (and, if desired, with default settings), and providing information indicative of the physical location and address (and, if desired, default settings) of the at least selected ones of the nodes to the control node (building computer), regardless of the order in which the physically installing and programming steps are executed.

With reference now to FIG. 2, there can be seen a block diagram of a wireless network 50 which can be installed using the above-described network installation method of the present invention. The wireless network 50 is preferably a wireless, packet-hopping network which is configured as an intelligent lighting control system. The wireless network 50 includes a plurality of individual nodes 52 and a building computer 54, which constitutes the control node of the network 50. Each of the individual nodes 52 preferably includes a lighting module(s) 53 and a node controller 56 coupled thereto.

Figure 3:
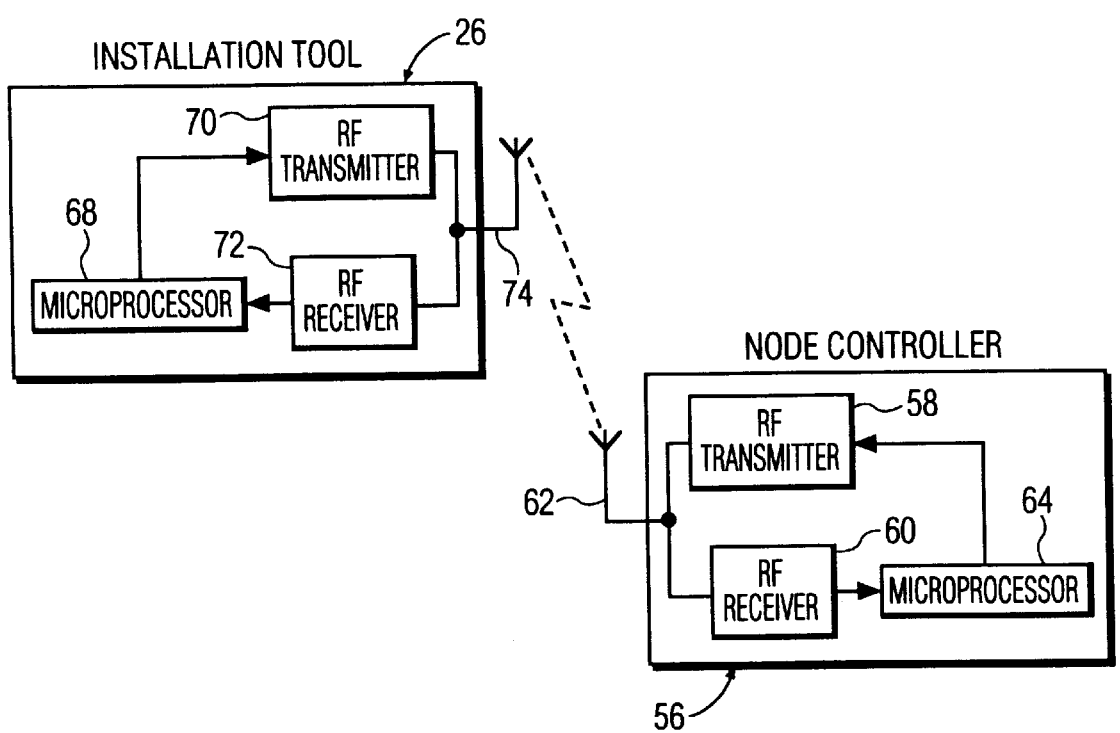

As can be seen in FIG. 3, the node controller 56 (of each node 52) preferably includes an RF transmitter 58 and an RF receiver 60 commonly coupled to an RF antenna 62, and a microprocessor 64 (or other suitable digital signal processing device) coupled to both the RF transmitter 58 and the RF receiver 60. The RF transmitter 58 and RF receiver 60 are typically provided together as an integrated component, i.e., as an RF transceiver. As can be seen in FIG. 2, the lighting module 53 (of each node 52) preferably includes a dimming ballast 55 and a lamp(s) 57 driven by the dimming ballast 55.

The wireless installation tool 26 is preferably a portable computer equipped with wireless communication facilities. For example, as depicted in FIG. 3, the wireless installation tool 26 preferably includes a microprocessor 68 coupled to both an RF transmitter 70 and an RF receiver 72. The RF transmitter 70 and RF receiver 72 are commonly coupled to an RF antenna 74. As indicated by the dashed line in FIG. 3, address and default parameter data is programmed into the node controller 56 of a given node 52 via an RF communication link between the RF transmitter 70 of the wireless installation tool 26 and the RF receiver 60 of the node controller 56. However, it should be appreciated by those skilled in the pertinent art that neither the type of wireless network nor the specific hardware utilized in connection with the practice of the network installation method of the present invention is limiting thereto.

In a presently preferred embodiment of the present invention, the step of using the wireless installation tool 26 to program the nodes 52 is preferably carried out in such a manner as to minimize the likelihood of an inadvertent transmission of address and default setting data from the wireless installation tool 26 to any node other than the node currently being programmed. To begin with, the RF transmitter 70 of the wireless installation tool 26 (which is preferably provided with a variable RF power setting) is preferably set to a very low RF power setting. Further, the wireless installation tool 26 is preferably held very close to the node currently being programmed, so that only the node currently being programmed is within the transmitting range of the RF transmitter 70 of the wireless installation tool 26. It should be noted that the nodes being installed operate on the same frequency as the wireless installation tool 26 during the installation procedure, but that the nodes 52 can be operated on different frequencies after installation.

Further, the step of using the wireless installation tool 26 to program the nodes 52 is preferably carried out utilizing a software "handshaking" procedure which ensures that the address and default setting data is only loaded into the node currently being programmed, and not inadvertently into one or more other nearby nodes. More particularly, in the presently preferred embodiment of the present invention, the nodes are programmed to automatically send an address acknowledgement response in response to receiving an address assignment command from the wireless installation tool 26 during the installation procedure.

If the wireless installation tool 26 receives more than one address acknowledgement response, then it is apparent that at least one node other than the node currently being programmed has inadvertently received the address assignment command from the wireless installation tool 26. In this connection, the wireless installation tool 26 is programmed to automatically issue a cancel address assignment command, to lower the RF power setting of the RF transmitter 70 of the wireless installation tool 26, and to then re-transmit the address assignment command at the lower RF power setting, in response to receiving more than one address acknowledgement response. This software "handshaking" procedure is iterated until only a single address acknowledgement response is received by the wireless installation tool 26, or until a failure occurs at the lowest possible RF power setting of the RF transmitter 70. Thus, the RF power setting of the RF transmitter 70 of the wireless installation tool 26 is interactively decreased until it receives an address acknowledgement response from only the node currently being programmed.

As a further aspect of the software "handshaking" procedure, the wireless installation tool 26 is also preferably programmed to issue (transmit) an address assignment confirmation command after the wireless installation tool 26 receives an address acknowledgement response from only the node currently being programmed. The node currently being programmed is preferably programmed to automatically store (set) the assigned address, and to automatically issue (transmit) an address set confirmation response, in response to receipt of the address assignment confirmation command from the wireless installation tool 26. Several reconfirmations can be used if an iterative power reduction is required to avoid multiple nodes from being assigned the same address.

A further concern regarding the integrity of the wireless programming procedure is the case in which no address acknowledgement response is received by the wireless programming tool 26, even though the node currently being programmed has actually received the address assignment command and issued the address acknowledgement response. In order to minimize the possibility of such an occurence, the RF power setting of the RF transmitter 58 of the node controller 56 of the node 52 currently being programmed (which also preferably has a variable RF power setting) is set to a very high level, so that the RF receiver 72 of the wireless installation tool 26 will have a sensitivity to the address acknowledgement responses that is much greater than the sensitivity of the RF receivers 60 of the node controllers 56 of the nodes 52 to the address assignment commands. Otherwise stated, the RF communication link between the RF receiver 72 of the wireless installation tool 26 and the RF transmitters 58 of the node controllers 56 of the nodes 52 is preferably much stronger than the RF communication link between the RF transmitter 70 of the wireless installation tool 26 and the RF receivers 60 of the node controllers 56 of the nodes 52.

After the nodes 52 and building computer 54 are installed, the wireless network 50 is then initialized, in order to provide the building computer 54 with nodal connectivity information which the network communications protocol requires in order to route packets of data through the network 50 by the previously described packet-hopping technique. The nodal connectivity information includes information as to which nodes 52 in the network 50 are able to communicate with each other. The building computer 54 formulates routing tables on the basis of the nodal connectivity information which it gathers during the network initialization process.

The building computer 54 then uses these routing tables to transfer packets of data from the building computer 54 to a destination node and from an origin node to the building computer 54 by hopping the packets from node-to-node along a route which it determines from the routing tables to be the most efficient route available at that time. An advantageous automatic initialization scheme is disclosed in the previously referenced, co-pending U.S. patent application Ser. No. 08/579,650, filed on Dec. 27, 1995, in the name of George A. Melnik.

As feedback to the user (typically the building operations personnel), the physical configuration of the wireless network 50 can be displayed on the monitor of the building computer 54, e.g., by illustrating the physical location of each node on a floor plan of the building. In this connection, the links between the nodes 52 of the network 50 can be automatically drawn during the initialization routine, to thereby provide a graphical representation of the wireless network 50 for diagnostic and operational purposes. Further, the room numbers collected during the installation process are preferably displayed on the floor plan for ease of reference.

The present invention also encompasses a method for installing one or more nodes in an existing wireless network, which method is performed in essentially the same manner as that described above in connection with the original installation of the wireless network itself, with the exception being that instead of an entire network of nodes being installed, only one or more nodes are installed in a pre-existing wireless network.

This process of installing one or more nodes in an existing wireless network is sometimes referred to as "incremental installation". Such a process may be utilized when one or more "new" nodes are added to an existing wireless network, or when one or more nodes are inadvertently "omitted" from the wireless network during the original initialization procedure.

It will be readily appreciated by those skilled in the pertinent art that the use of a wireless installation tool provides several significant advantages over prior techniques for installing a wireless network, including, but not limited to, eliminating the need for connectors and wires at the nodes (except for connection to the power supply), providing an opportunity for testing the operation of the nodes prior to completion of installation of the network (and prior to execution of the network initialization routine), and reducing the cost and time required for installation of the wireless network.

Although the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A method for installing a wireless network, including the steps of:
    physically installing a plurality of nodes in respective different locations in a building; and
    using a wireless installation device to program one of the nodes with its node address, said node address being transmitted wirelessly directly from said wireless installation device to said one node.

2. The method as set forth in claim 1, further including the step of providing information regarding the physical location and node address of said one node to a control node.

3. The method as set forth in claim 1, further including the step of using the wireless installation device to program said one node with one or more default parameters in addition to its node address, said one or more default parameters being transmitted wirelessly from said wireless installation device directly to said one node without using the wireless network being installed.

4. The method as set forth in claim 1, further including the step of using the wireless installation device to verify proper operation of said one node without using the wireless network being installed.

5. The method as set forth in claim 3, further including the step of using the wireless installation device to verify proper operation of said one node without using the wireless network being installed.

6. The method as set forth in claim 1, further including the step of connecting said one node to a power supply and powering up said one node, prior to the step of using the wireless installation device.

7. The method as set forth in claim 1, wherein the step of using the wireless installation device is carried out using a software handshaking procedure designed to ensure that only said one node is programmed with said node address.

8. The method as set forth in claim 1, further including the step of using said wireless installation device to download information regarding the physical location and node address of said one node to a control node.

9. The method as set forth in claim 1, wherein said wireless installation device comprises a portable computer equipped with RF communications facilities.

10. The method as set forth in claim 1, wherein:
    said wireless installation device includes an RF transmitter having a variable RF power setting;
    the step of using the wireless installation device is carried out by holding said wireless installation device close enough to the node currently being programmed, and by adjusting said variable RF power setting to a low enough level to ensure that only the node currently being programmed is within a transmitting range of said RF transmitter.

11. The method as set forth in claim 1, wherein:
    said one node includes an RF transmitter and an RF receiver;
    said wireless installation device includes an RF transmitter and an RF receiver; and
    wherein a first RF communication link between said RF receiver of said wireless installation device and said RF transmitter of said one node is stronger than a second RF communication link between said RF transmitter of said wireless installation device and said RF receiver of said one node.

12. The method as set forth in claim 1, wherein:
    the wireless network comprises an intelligent lighting control system;
    each of the nodes includes a lighting module and a node controller coupled to said lighting module;
    said node controller of each of said nodes includes a digital signal processing device, an RF transmitter, and an RF receiver, said RF transmitter and said RF receiver being commonly coupled to said digital signal processing device;
    said wireless installation device includes a digital signal processing device, an RF transmitter, and an RF receiver, said RF transmitter and said RF receiver being commonly coupled to said digital signal processing device; and, said control node comprises a building computer.

13. The method as set forth in claim 1, wherein said node addresses are wirelessly transmitted without using the wireless network being installed.

14. The method as set forth in claim 1, wherein said node addresses are wirelessly transmitted prior to use of said network to execute an initialization routine with said at least selected ones of the nodes.

15. A method for installing a wireless network, including the steps of:

physically installing a plurality of nodes in respective different locations in a building; and using a wireless installation device to program at least selected ones of the nodes with a respective address, wherein the step of using the wireless installation device is carried out using a software handshaking procedure designed to ensure that only the node currently being programmed is programmed with said address, and wherein, in accordance with said software handshaking procedure:

said wireless installation device transmits an address assignment command over a prescribed transmitting range;

each node which receives said address assignment command transmits an address acknowledgment response for return to said wireless installation device; and, said wireless installation device transmits a cancel address assignment command over said prescribed transmitting range, decreases said prescribed transmitting range, and re-transmits said address assignment command over the decreased transmitting range.

16. The method as set forth in claim 15, wherein said software handshaking procedure is iterated until only a single address acknowledgement response is received by said wireless installation device.

17. The method as set forth in claim 16, wherein further, in accordance with said software handshaking procedure:

said wireless installation device transmits an address assignment confirmation command in response to said wireless installation device receiving a single address acknowledgement response; and, the node currently being programmed transmits an address set confirmation response, in response to receipt of said address assignment confirmation command.

18. The method as set forth in claim 15, wherein said wireless installation device comprises a portable computer equipped with RF communications facilities.

19. The method as set forth in claim 18, wherein:

said wireless installation device includes an RF transmitter having a variable power setting, and an RF receiver; and, said prescribed transmitting range of said wireless installation device is decreased by lowering said variable power setting of said RF transmitter.

20. A method for installing at least one additional node in a wireless network which includes a control node and a plurality of other nodes, including the steps of:

physically installing said at least one additional node;

connecting the at least one additional node to a power supply and powering up the at least one additional node;

using a wireless installation device to program a respective address into said at least one additional node;

using said wireless installation device to program one or more default settings in addition to said respective address into said at least one additional node;

using said wireless installation device to verify operation of said at least one additional node; and, using said wireless installation device to dump at least information regarding a physical location and associated address of said at least one additional node to the control nodes wherein said respective address and said one or more default settings are transmitted wirelessly directly from said wireless installation device to said at least one additional node without using the wireless network, and wherein said using of said wireless installation device to verify operation of said at least one additional node and to dump information to the control node is done without using the wireless network.

21. The method as set forth in claim 20, wherein:

said wireless installation device comprises a portable computer equipped with RF communications facilities; and, said at least one additional node includes an RF transceiver.

22. A method for installing a wireless network, including the steps of:

physically installing a node to be included in the wireless network in a respective location in a building;

connecting the node to a power supply and powering up the node;

using a wireless installation device to program a respective address into the node;

using said wireless installation device to program one or more default settings in addition to said respective address into the node;

using said wireless installation device to verify operation of the node; and, repeating each of the above-recited steps for each of the nodes to be included in the wireless network until all of the nodes to be included in the wireless network have been installed.

wherein said respective address and said one or more default settings are transmitted wirelessly directly from said wireless installation device to the node without using the wireless network being installed, and wherein said using of said wireless installation device to verify operation of the node is done without using the wireless network being installed.

23. The method as set forth in claim 22, further including the step of using said wireless installation device to dump at least information regarding said physical location and associated address of the nodes to a control node.

* * * * *